United States Patent [19]

Ogasawara et al.

[11] Patent Number: 4,727,967
[45] Date of Patent: Mar. 1, 1988

[54] PARKING MECHANISM OF A TRANSMISSION

[75] Inventors: Tsunehiko Ogasawara, Kariya; Koji Sumiya, Nishio, both of Japan

[73] Assignees: Aisin Seiki Kabushiki Kaisha; Aisin Warner Kabushiki Kaisha, both of Aichi, Japan

[21] Appl. No.: 585,126

[22] Filed: Mar. 1, 1984

[30] Foreign Application Priority Data

Mar. 31, 1983 [JP] Japan .................. 58-057497

[51] Int. Cl.$^4$ .................. B60K 41/26; B60T 1/06
[52] U.S. Cl. .................. 192/4 A; 74/411.5; 188/31
[58] Field of Search .............. 192/4 A; 74/99 A, 104, 74/107, 411.5, 567; 188/31, 60, 69

[56] References Cited

U.S. PATENT DOCUMENTS

| | | | |
|---|---|---|---|
| 3,386,532 | 6/1968 | Moss | 192/4 A |
| 3,601,230 | 8/1971 | Platz | 192/4 A |
| 3,690,416 | 9/1972 | Yamada | 188/31 |
| 3,912,050 | 10/1975 | Iwanaga et al. | 192/4 A |
| 4,223,768 | 9/1980 | Iwanaga | 192/4 A |
| 4,360,086 | 11/1982 | Bond et al. | 74/110 |
| 4,413,712 | 11/1983 | Richard | 192/4 A |
| 4,585,103 | 4/1986 | Kuwayama et al. | 192/4 A |

FOREIGN PATENT DOCUMENTS 1445245  8/1976  United Kingdom .............. 192/4 A

Primary Examiner—Rodney H. Bonck
Assistant Examiner—Richard M. Lorence
Attorney, Agent, or Firm—Burns, Doane, Swecker & Mathis

[57] ABSTRACT

An end of a shaft member which is displaced and actuated in conjunction with a shift lever of a transmission presses and displaces a latch which is arranged in such a way as to be able to be displaced in an opposing direction against a cam surface of a cam which is formed on a fixed member to function like a wedge which wedges itself between said cam surface and latch, thereby making the latch engage teeth which are drivingly coupled to an output shaft of the transmission in a parking mechanism of a transmission. A cylindrical support portion is continuously extended from the cam surface so as to guide the end of the shaft member at the time when the end of the shaft member is disengaged from the area between the cam surface and latch.

17 Claims, 13 Drawing Figures

PARKING MECHANISM OF A TRANSMISSION

FIELD OF THE INVENTION

The present invention relates to a parking mechanism of the transmission. In more detail, the invention relates to a parking mechanism of a transmission which is adapted to fix an output shaft by making a latch engage teeth which are drivingly or operatively coupled to an output shaft of a transmission for a vehicle.

BACKGROUND OF THE INVENTION

In general, a parking mechanism of a transmission for a vehicle, in particular, a parking mechanism of a transmission which is actuated in conjunction with the operation of a manual shift lever is usually constructed as follows. A lever and detent mechanism is rotated by the operation of a manual shift lever so that the detent and shaft rotate integrally. The rear end of a rod to which is fitted a cam at the forward end thereof is linked with the above mentioned lever. And if the cam runs onto an inclined surface of a bracket which surface is projected forwards in the moving direction thereof, a pawl lever, with a pawl, mounted perpendicular to the bracket is pushed up thereby, so that the pawl of the pawl lever engages a parking gear which is drivingly or operatively coupled to an output shaft of the transmission, thereby locking the output shaft. Since the bracket and the rod with the cam are guided conventionally by the long rod which is projected towards the front area of the cam in the parking mechanism of the transmission of this type, there is caused a drawback in that the dimension in the axial direction becomes large. Since it is required to shorten the dimension in the axial direction of the transmission, in particular, in the case of the transverse setting of the engine as in the front wheel drive cars and the like, the parking mechanism of the transmission of the above mentioned type is improper.

SUMMARY OF THE DISCLOSURE

Accordingly, it is an object of the present invention to provide a novel parking mechanism of a transmission in which the drawback of the prior art is eliminated.

It is another object of the present invention to provide parking mechanism of a transmission in which the portion to be projected in the front are of the cam of the rod for actuating a pawl lever can be made short.

It is a further object of the present invention to provide a parking mechanism in which the rigidity of a sleeve with a bracket which is used for shortening the rod is enhanced, the supporting and fixing thereof to a case becomes easy and the size thereof can be made small.

Other objects will become apparent in the entire disclosure.

In a parking mechanism of a transmission of the type in which an end of a shaft member which is displaced and actuated in conjunction with a shift lever of a transmission presses and displaces a latch which is arranged in such a way as to be able to be displaced in an opposing direction against a cam surface of a cam which is formed on a fixed member by a function like a wedge which wedges itself into between said cam surface and latch, thereby making the latch engage teeth which are drivingly coupled to an output shaft of the transmission, the present invention is characterized in that a cylindrical support portion is continuously extended from said cam surface so as to support the end of the shaft member at the time when the end of the shaft member is disengaged from between the cam surface and the latch.

Preferred embodiments of the present invention will now be disclosed in connection with the accompanying drawings which, however, are being presented for better understanding and not for limitative purpose. Modifications apparent in the art may be made without departing from the gist and features of the present invention as disclosed and claimed.

DETAILED DESCRIPTION OF THE PREFERRED EMBODIMENTS

Figure 1:
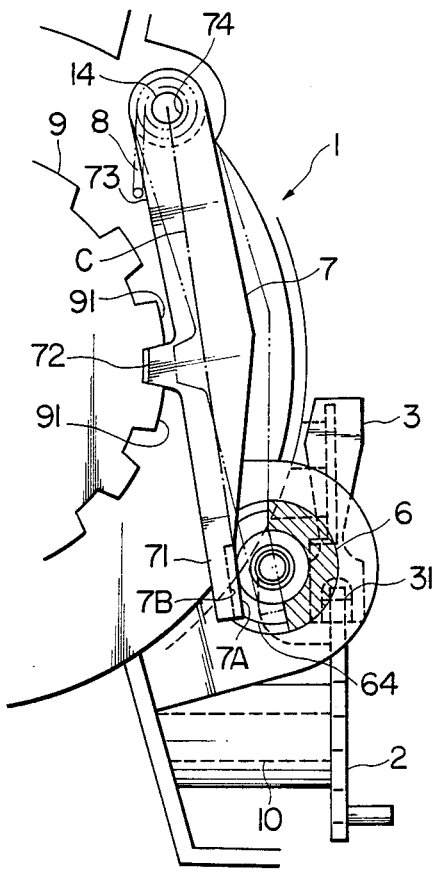
FIG. 1 is a cross sectional view showing a parking mechanism of an automatic transmission in accordance with the first embodiment of the present invention.
Figure 2:
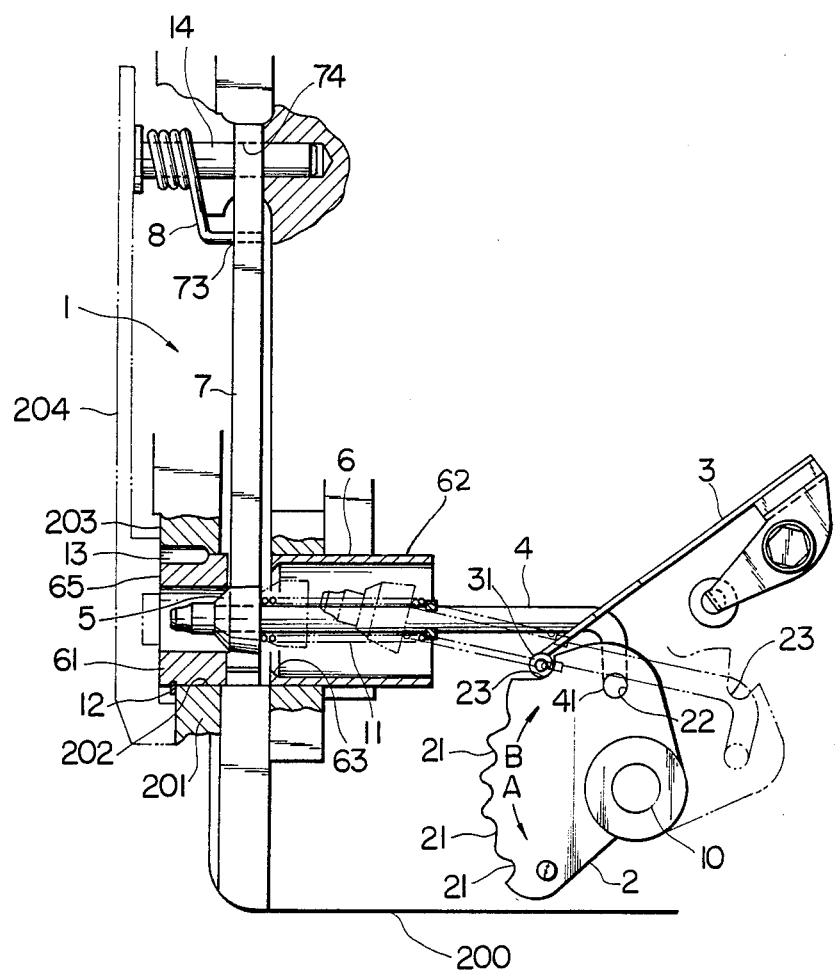
FIG. 2 is a front view thereof.
Figure 3:
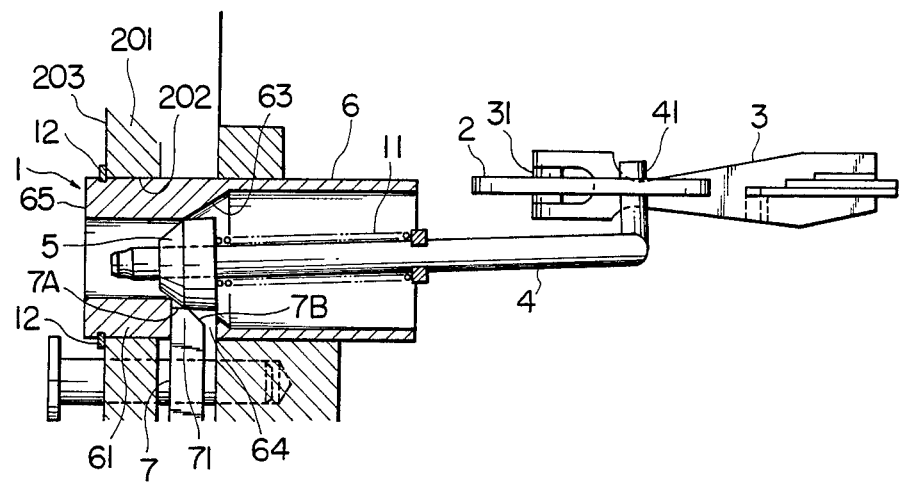
FIG. 3 is a plan veiw thereof.

FIG. 1–FIG. 3 show an embodiment in which an end (bracket portion side end) of a sleeve with a bracket is fixed to a rear end wall portion of a transmission case of an automatic transmission for FF system (front engine, front drive car system) in which a parking gear is arranged.

A parking gear 1 is composed of a detent lever 2 and a detent spring 3 which constitute a detent mechanism, a rod 4 which is a shaft member which is displaced and actuated in conjunction with a shift lever (not shown), a cam 5 with a cam surface which is provided at an end of the rod 4, a sleeve 6 with a bracket which bracket makes a cylindrical guide portion extend continuously from the cam surface so as to guide the end of the shaft member at the time when the end of the shaft member is disengaged from an area between the cam surface and a latch which will be mentioned later, a pawl lever 7 with a pawl which acts on the latch, a spring 8 and a parking gear 9 which is provided with engaging teeth 91 which are drivingly coupled to an output shaft of a transmission.

The detent lever 2 is directly coupled to a manual shaft 10 which rotates in conjunction with the operation of a manual shift lever (not shown) which is provided in the driver's cabin. This detent lever 2 of a plate-like member rotates integral with the manual shaft 10 thereabout. A roller 31 which is mounted to the end of the detent spring 3 engages a plurality of engaging notches 21 (in the embodiment, six engaging notches which correspond to the positions of P, R, N, D, 2, L) corresponding to the manual shift positions as formed continuously on the outer peripheral surface of the lever 2 so that the detent force (i.e., force retaining at each detent position) works at each engaging position. And the rear end 41 of the rod 4 whose rear portion is bent is rotatably mounted in a hole 22 which is formed at one end of the detent lever 2.

The rod 4 axially moves forwards and rearwards by the rotation of the detent lever 2. To the rod 4 is provided the cam 5 which is connected via (i.e., spring-backed with) a coiled spring 11 which is fitted onto the end of the rod 4 in such a way as to be able to slide forwards and rearwards, so that the rod 4 with the cam moves forwards by them, thereby pushing out the cam 5 connected via the coiled spring 11. The cam 5 presents the configuration of a multi-stage truncated cone in which a gentle cone with a small crossing angle with the axis and a steeply angled cone with a large crossing angle which have their apexes in the direction of the end of the rod 4 are alternately formed in two stages.

The sleeve 6 with the bracket is like a cylinder whose wall of a forward end 61 is formed thick inwards. The thick forward end 61 and the thin rear end 62 are connected via a tapered, inclined surface 63. Between the rear portion of the forward end 61 and the inclined surface 63, there is extending a substantially half circular cut portion 64, whose cut surface is perpendicular to the axis. The sleeve 6 is inserted into a hole 202 at the rear end 201 of a transmission case 200 so as to be mounted in such a way that its end 65 is exposed on the rear surface 203 of the case and fixed by a snap ring 12, the rotation of the sleeve 6 being prevented by a key 13. The sleeve 6 is retained by a plate (a rear cover 204 in this embodiment) which is fastened to the case rear surface 203 against the force which works in the direction towards the end 65 upon parking actuation.

The cam 5 moves forwards while being guided as the lever 2 rotates in the direction indicated by the arrow A in the cylindrical sleeve 6 which is fitted to the case rear end 201, climbs the inclined surface 63, forcibly enters into the gap between the thick end 61 and the end 71 of the pawl lever 7 with the pawl which is pushed against the cut portion 64 and starts to push up the pawl lever 7 from a position which is shown by the two dotted chained line in FIG. 1. And if the P (parking) range notch 23 of the lever 2 engages the roller 31 at the end of the detent spring, the cam 5 runs on the thick end, that is, the bracket 61 so as to push up the pawl lever 7 up to a position which is shown by the solid line.

The pawl lever 7 with the pawl is provided with the forward end, the pawl lever 7 being comprised of a cam engaging portion 71, the pawl 72 at the middle portion thereof, an engaging portion 73 of the spring 8 at the rear side of the pawl 72 and the support hole 74 at the rear end. The cam engaging portion 71 is composed of a planar surface 7A and an inclined surface 7B, the planar surface 7A extending in the direction of the normal line (one dot-chained line C direction as shown in the drawing) passing through the center line of a shaft 14 supporting the pawl lever 7 with the pawl in a support hole 74.

The pawl lever 7 with the pawl which is pushed up by the cam 5 rotates in the direction which is perpendicular to the advancing direction of the cam 5 about the shaft 14 which is fitted into the support hole 74 at the rear end as the center so as to cause the pawl 72 of the pawl lever 7 to engage the parking gear 9, thereby locking the vehicle. In addition, the spring 8 is fitted onto the shaft 14, so that the cam engaging portion 71 of the pawl lever 7 with the pawl is pushed towards the bracket 61.

The pawl lever 7 with the pawl may be formed of two sheet-members so that one of them is provided with the pawl 72 and the other is provided with the cam engaging portion 71, and a spring member is provided on them so that they rotate away from each other about the shaft 14, it will become unnecessary to provide the coiled spring 11 and it is acceptable that the cam 5 be directly fixed to the rod 4.

Now, an explanation will be given in respect of the operation in case the parking gear 9 is engaged and disengaged.

If the detent lever rotates in the A direction by the manual operation so that the P range notch 23 engages the end 31 of the detent spring, the cam 5 runs onto the bracket 61 so as to push up the pawl lever 7 with the pawl, thereby causing the pawl 72 of the pawl lever 7 to engage the parking gear 9. The pawl 72 of the pawl lever 7 is set so as not to engage when the rotation speed of the parking gear 9 is equal to or higher than a predetermined rotation speed, the pawl lever 7 with the pawl swings and oscillates as the cam 5 oscillates forwards and rearwards by the spring load of the spring 8 which is exerted in the direction of swing (rotation) about the shaft 14 and the spring load of the coiled spring 11 supporting the cam 5. If the rotation speed of the parking gear 9 becomes low, the pawl 72 of the pawl lever engages the parking gear 9 by the equilibrium relationship of the disengaging force, between the parking gear 9 and the pawl 72, of the spring 8 and the engaging force, between the parking gear 9 and the pawl 72, of the coiled spring 11 the engaging force being set larger than the above mentioned disengaging force.

If the detent lever 2 is rotated in the B direction by the manual operation, the pawl lever 7 with the pawl is disengaged from the parking gear 9 by the disengaging force of the spring 8 because the coiled spring 11 supporting the cam 5 loses its force to cause the pawl lever 7 with the pawl to engage the parking gear 9.

In addition, since the slippage in the direction which is perpendicular to the advancing direction of the cam 5 which is caused between the cam 5 and the engaging portion 71 of the pawl lever 7 at the time when the cam 5 pushes up the pawl lever 7 with the pawl is very small in the engaging and disengaging movement as mentioned above, it is possible to prevent the abrasion of the cam due to the slipping oscillation in the perpendicular direction which is caused as the cam 5 oscillates forwards and rearwards and the pawl lever 7 with the pawl rotates and oscillates.

Figure 4:
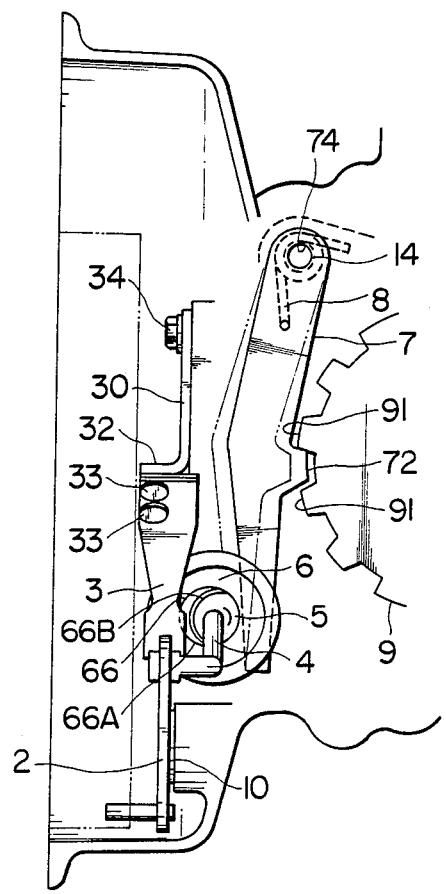
FIG. 4 is a side view showing a parking mechanism in accordance with the second embodiment.
Figure 5:
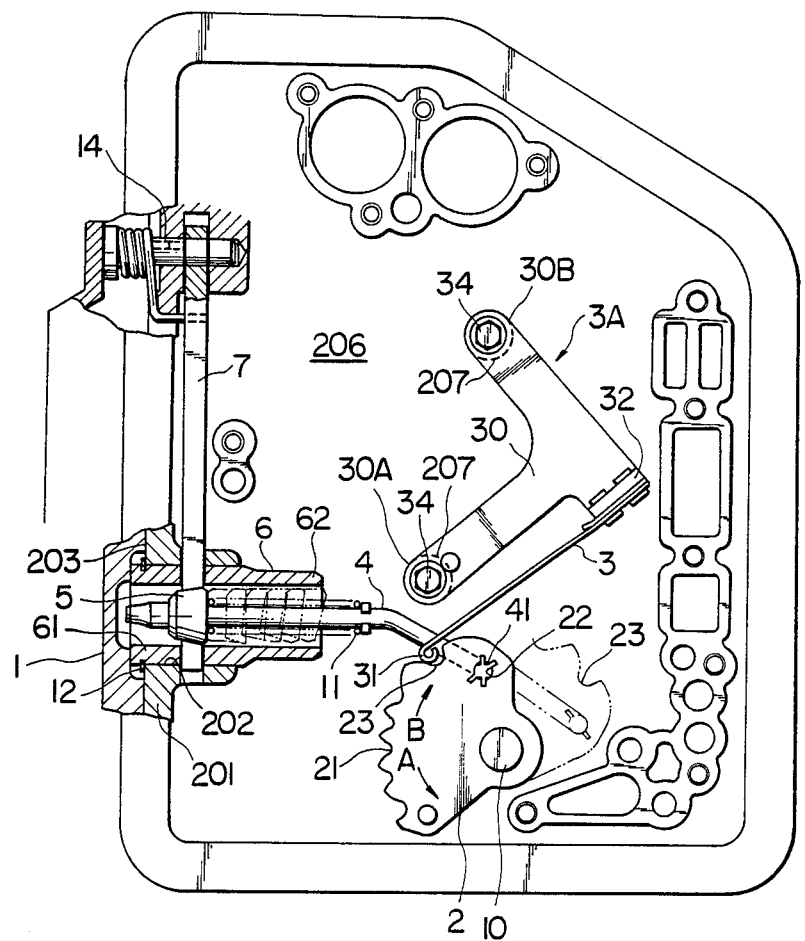
FIG. 5 is a front view thereof.
Figure 6:
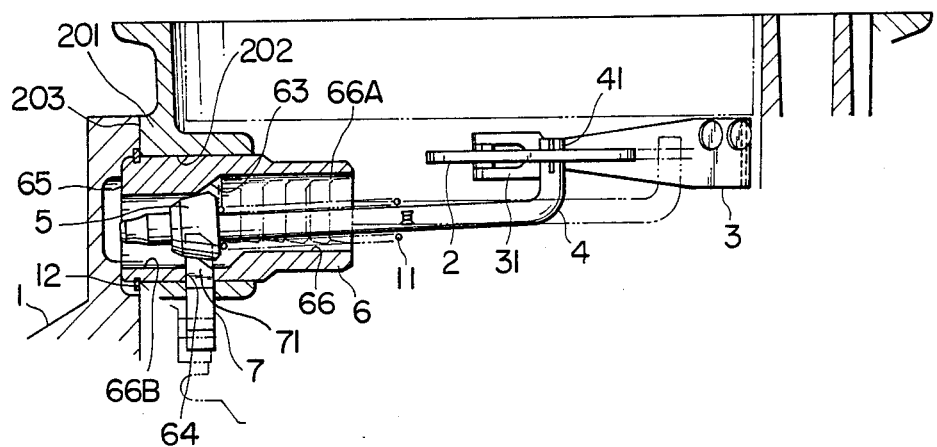
FIG. 6 is a plan view thereof.

FIGS. 4–6 show the second embodiment in accordance with the present invention.

In accordance with this embodiment, the sleeve 6 with the bracket is constituted as hereinbelow, the sleeve 6 being a cylindrical support portion for supporting the end of the rod 4 at the time when the end of the rod 4 of a shaft member displaced and actuated in conjunction with the shift lever is disengaged from the area between the cam surface of the cam 5 and the pawl lever 7 with the pawl acting a latch.

The center hole 66 in the sleeve with the bracket is composed of one hole 66A in the axial direction and another hole 66B in the axial direction of the same diameter as the hole 66A whose centers are displaced from each other to constitute an inclined surface 63 which forms the bracket in the displacing direction of the pawl lever 7 with the pawl with the same radius from both the ends of the cam 5 as shown in FIG. 4 and FIG. 6. In this case, since it is possible to make the dimension of the inner diameter of the hole 66 of the sleeve 6 approach the maximum outer diameter of the cam 5, it becomes possible to increase the retaining and guiding function in the radial direction of the rod 4 by the sleeve 61. In this second embodiment, the detent spring 3 is rivetted to a bracket 3A by rivets 33, 33 at an arm portion 32 which extends from the corner portion of a base portion 30 having a planar configuration of the substantially L-shape, the arm portion 32 being bent substantially in perpendicular to the surface of the base portion 30. This bracket 3A is fixed to boss portions 207, 207 which are projectedly provided on the barrel portion 206 of the transmission case 200 with screws 34, 34 at the substantially L-shaped both ends 30A, 30B of the base portion.

Figure 7:
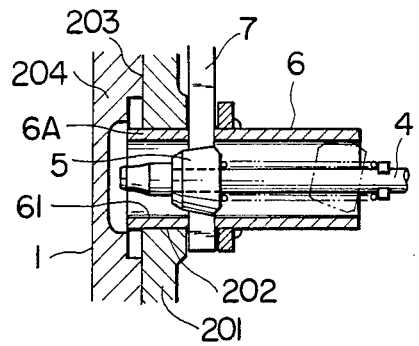
FIG. 7 is a cross sectional view showing essential parts of a parking mechanism in accordance with the third embodiment.
Figure 8:
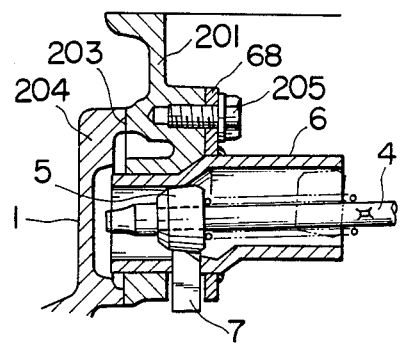
FIG. 8 is a front view thereof in cross section.

FIG. 7 and FIG. 8 show the third embodiment.

In accordance with the present embodiment, a pipe member is forged to displace the axis as shown in FIG. 8, thereby constituting the sleeve 6 substantially of the same function as in the second embodiment. The end 6A of the sleeve 6 is fitted into the hole 202, and the fixing of the sleeve 6 and the case rear end wall 201 is done by fastening a flange 68 welded on the outer periphery of the sleeve 61 and the case rear end wall 201 by a bolt 205.

Figure 9:
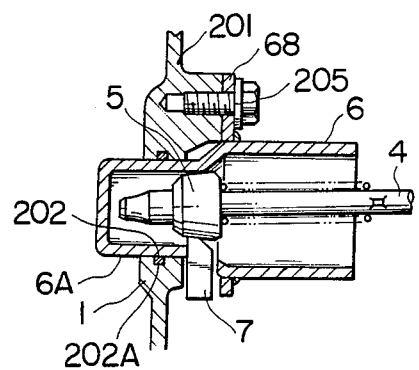
FIG. 9 is a front view in cross section showing a parking mechanism in accordance with the fourth embodiment.

FIG. 9 shows the fourth embodiment.

In accordance with this embodiment, the sleeve 6 of a construction which is similar to that shown in the first embodiment is formed of a forged, stepped pipe. The end 6A of a small diameter is fitted into the hole 202, and a seal member 202A is provided at the fitting portion. Therefore, it is possible to remove one portion of the rear cover 204 which covers the hole 202 of the case rear end wall 204.

Figure 10:
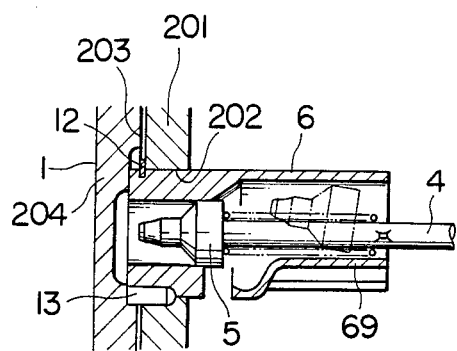
FIG. 10 is a front view in cross section showing a parking mechanism in accordance with the fifth embodiment.
Figure 11:
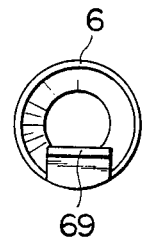
FIG. 11 is a right side view in cross section showing a sleeve thereof.

FIG. 10 and FIG. 11 show the fifth embodiment.

In accordance with this embodiment, there are formed two parallel cut lines at the thin portion of a stepped pipe with a portion whose inner diameter is tapered in the sleeve 6 and the sleeve wall 69 between the above mentioned cut lines is plastic-deformed inwardly toward the axis thereby increasing the guiding function in the displacing surface of the rod 4.

Figure 12:
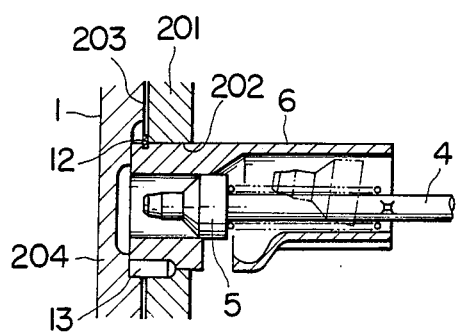
FIG. 12 is a front view in cross section showing a parking mechanism in accordance with the sixth embodiment.
Figure 13:
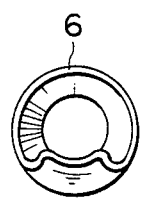
FIG. 13 is a right side view in cross section showing a sleeve thereof.

FIG. 12 and FIG. 13 show the sixth embodiment.

In accordance with this embodiment, the pipe in the fifth embodiment is forged so as to obtain a similar construction of a partially crushed pipe wall.

In a parking mechanism of a transmission of the type as mentioned in the summary of the Disclosure, i.e., in which an end of a shaft which is displaced and actuated in conjunction with a shift lever of a transmission presses and displaces a latch which is arranged in such a way as to be able to be displaced in an opposing direction against to a cam surface of a cam which is formed on a fixed member by a function like a wedge which wedges itself into between the cam surface and latch, thereby making the latch engage teeth which are drivingly coupled to an output shaft of the transmission, a cylindrical guide portion is continuously extended from the cam surface so as to support the end of the shaft member at the time when the end of the shaft member is disengaged from the area between the cam surface and the latch in accordance with the present invention as mentioned above.

As the result, it is possible to shorten the projected portion in front of the cam of the rod, so that the dimension in the axial direction of the transmission is shortened. In addition, since the sleeve with the bracket is formed of an integral cylinder, the rigidity of the bracket is enhanced, the supporting and fixing thereof to the case becomes easy and the size thereof becomes small. Furthermore, if the integral sleeve with the bracket is arranged so as to be supported and fixed just near the end surface of the transmission and the parking gear, and the pawl lever with the pawl and the like are also arranged at the end portion, it is possible that the parking mechanism as a whole is within a narrow surplus space of the end portion at the marginal corner area of the transmission, thereby bringing about the effect in that the space in the transmission can be effectively utilized and the preparing and assembling performance also can be enhanced.

What is claimed is:

1. A parking mechanism of a transmission comprising:
   a latch displaceable to engage and disengage with teeth which are operatively coupled to an output shaft of the transmission;
   a cam surface formed on an inner surface of a stationary sleeve;
   a shaft member having a working portion engageably and disengageably disposed with respect to said cam surface, said shaft member displaceable axially in cooperation with a shift lever of the transmission so as to displace the working portion of said shaft member engagingly and disengagingly with said cam surface;
   means for mounting said latch with a portion of said latch positioned relative to said cam surface so that engagement and disengagement of said working portion with said cam surface causes said latch to engage and disengage with said teeth, whereby the movement of said shaft member to engage said working portion with said cam surface produces a wedging action displacing the latch in a direction to engage itself with said teeth; and
   a cylindrical guide portion formed on an inner surface of said sleeve continuously extending from said cam surface for guiding said working portion of said shaft member when the working portion of the shaft member is disengaged from said cam surface;
   wherein said cam surface and said cylindrical guide portion are made of an integral body.

2. The parking mechanism as defined in claim 1, wherein said working portion of said shaft member includes an engaging member disposed on an end of the shaft member for engaging with the cam surface and the latch.

3. The parking mechanism as defined in claim 2, wherein the engaging member includes a first conical engaging surface working in cooperation with said cam surface.

4. The parking mechanism as defined in claim 3, wherein the engaging member includes a second engaging surface extending from said first conical engaging surface.

5. The parking mechanism as defined in claim 4, wherein said second engaging surface has a smaller intersecting angle about the axis of the shaft member than said first engaging surface.

6. The parking mechanism as defined in claim 2, wherein said engaging member is axially retained on the shaft member by a back spring.

7. The parking mechanism as defined in claim 1, wherein said integral body includes a cutout portion for receiving an end of said latch.

8. The parking mechanism as defined in claim 1, wherein said cylindrical guide portion has a larger inner diameter than the forward end portion diameter of the cam surface.

9. The parking mechanism as defined in claim 8, wherein said cylindrical guide portion includes a guide portion with a smaller inner diameter than a remaining portion of the cylindrical guide.

10. The parking mechanism as defined in claim 1, wherein said cylindrical guide portion has an inner diameter substantially as the cam surface portion.

11. The parking mechanism as defined in claim 1, wherein said cam surface is formed by machining from a cylindrical member.

12. The parking mechanism as defined in claim 1, wherein said cam surface is formed by forging.

13. The parking mechanism as defined in claim 1, wherein said integral body is secured on an end of a transmission case.

14. The parking mechanism as defined in claim 13, wherein said integral body is secured substantially in the transmission case.

15. The parking mechanism as defined in claim 1, wherein a hole is formed on an inner surface of said sleeve continuously extending from said cam surface on the opposite side to said cylindrical guide portion.

16. The parking mechanism as defined in claim 1, wherein a center axis of said cylindrical guide portion is coaxial with a center axis of said hole.

17. The parking mechanism as defined in claim 1, wherein a center axis of said cylindrical guide portion is displaced from a center axis of said hole in the sleeve on the opposite side of the cam surface to the cylindrical guide portion.

* * * * *